(12) United States Patent
Kuo

(10) Patent No.: US 10,187,424 B2
(45) Date of Patent: Jan. 22, 2019

(54) CUSTOM SECURITY BROWSER

(71) Applicant: Sony Corporation, Tokyo (JP)

(72) Inventor: Jenke Wu Kuo, San Diego, CA (US)

(73) Assignee: Sony Corporation, Tokyo (JP)

( * ) Notice: Subject to any disclaimer, the term of this patent is extended or adjusted under 35 U.S.C. 154(b) by 325 days.

(21) Appl. No.: 15/175,313

(22) Filed: Jun. 7, 2016

(65) Prior Publication Data

US 2017/0353488 A1    Dec. 7, 2017

(51) Int. Cl.
*H04L 29/06* (2006.01)
*H04L 29/08* (2006.01)

(52) U.S. Cl.
CPC ...... *H04L 63/1466* (2013.01); *H04L 63/0245* (2013.01); *H04L 63/145* (2013.01); *H04L 63/1483* (2013.01); *H04L 63/168* (2013.01); *H04L 67/02* (2013.01)

(58) Field of Classification Search
CPC .................................................. H04L 63/1466
USPC .......................................................... 726/23
See application file for complete search history.

(56) References Cited

U.S. PATENT DOCUMENTS

| | | | | |
|---|---|---|---|---|
| 8,136,100 B1* | 3/2012 | Goldman | ................. | G06F 8/61 717/120 |
| 8,965,880 B2* | 2/2015 | Mizuno | ............. | G06F 17/30867 707/722 |
| 9,112,900 B1* | 8/2015 | Peacock | ............... | G06F 17/2247 |
| 2003/0195963 A1 | 10/2003 | Song et al. | | |
| 2007/0061487 A1* | 3/2007 | Moore | .............. | G06F 17/30575 709/246 |
| 2015/0058986 A1* | 2/2015 | Zhao | ....................... | H04L 67/02 726/23 |
| 2016/0248795 A1* | 8/2016 | Chien | ................. | H04L 63/1458 |

FOREIGN PATENT DOCUMENTS

WO    2009023647    8/2007

OTHER PUBLICATIONS

"WebBrowser Customization", Microsoft | Developer Network, (17 pages). Retrieved on May 2, 2016 from https://msdn.microsoft.com/en-us/library/aa770041%28v=vs.85%29.aspx.

* cited by examiner

*Primary Examiner* — Khalil Naghdali
(74) *Attorney, Agent, or Firm* — John L. Rogitz

(57) ABSTRACT

A custom browser can be setup or configured by end user to scan, monitor, filter out or eliminate any element of HTTP or HTTPS or Java script code or cookie downloading from the Internet in real time. The browser with custom security protects and eliminates unnecessary data or hacker attempts from the Internet by transcoding the downloading HTML/HTML5 code without requiring any plug-in, security app or changed system security level of devices. The application is particularly useful in IPTV and Remote UI HTML5 implementations.

14 Claims, 3 Drawing Sheets

CUSTOM SECURITY BROWSER

FIELD

The application relates generally to custom security browsers.

BACKGROUND

Current Internet browsers are typically customized by service providers to be configured with the service provider's favorite service or applications, including any security features the browser might have. Present principles understand that this is a salient point, because downloading hypertext markup language (HTML) or Javascript code and associated data are controlled by downloading server and services through standard browser mechanisms that are tailored by the service providers. Thus, the end user is using his browser to access content that is controlled by service and server and has little control over how to execute downloaded HTML code. This may be problematic because such downloaded code may become advertising, pop-ups, and "phishing" code that is dangerous to the computer operation as it is being executed. Simply monitoring such HTML code using a blacklist of suspect uniform resource identifiers (URI) or keywords may miss otherwise dangerous code.

SUMMARY

Present principles use a custom browser or browser plug-in to protect a downloading computer and eliminate unnecessary data or hacker software from the Internet by transcoding the downloading HTML/HTML5 code. This prevents the hacked or phishing HTML code being downloaded from being executed, which would otherwise damage the user device. As understood herein, a browser can run faster and more securely on the browsing contents after transcoding. The executing computer can rely on the browser and does not have to rely on external security such as network gateways or firewall security. The custom security browser has its own security and can be configured by an end user.

In an example, a "media" element URI and its parameters can be monitored and transcoded as dictated by user setup of a security zoom that won't hack or damage the device system/data. A status notification message or a separate warning window can pop up to notify the user of how the browser decides if downloaded code should be executed.

Accordingly, a device includes at least one computer memory that is not a transitory signal and that in turn includes instructions executable by at least one processor to receive at least one user selection of at least one network item for transcoding at such time as the network item is encountered on a wide area computer network by a browser. The instructions are executable to, responsive to the browser navigating to a location on the wide area network at which the network item is encountered, transcode the network item prior to executing the item to render a transcoded item. The instructions are further executable to determine whether to execute at least a portion of the transcoding item.

The computer memory and processor can be components of an end user computer. The instructions may be native to the browser, i.e., programmed into the browser by the browser manufacturer, or may be part of a plug-in associable with the browser.

The determining whether to execute at least a portion of the transcoding item may be responsive to user input or it may be automatic without requiring a user response prior to determining whether to execute the item. When done per user input, the user input can be from a user interface (UI) presented on an end user computer. The UI can include one or more of a first selection to remove suspicious code found in the transcoded item and only then execute the transcoded item minus the suspicious code, delete all versions of the item, transcoded and original, and execute the transcoded item including the suspicious code.

In another aspect, a computer includes a storage including computer instructions, a network interface, and a processor configured to access the instructions to present at least one user interface (UI) facilitating at least one user selection of at least one network item for transcoding at such time as the network item is encountered on a wide area computer network by a browser executed by the processor. The processor responsive to executing the instructions, and responsive to the browser navigating to a location on the wide area network at which the network item is encountered, transcodes the network item prior to executing the item.

In examples, the UI facilitates a user selection to have all items encountered on the wide area network transcoded prior to execution. In addition or alternatively, an example UI may facilitate a user selection to have only user-selected individual items transcoded prior to execution of the individual items. In addition or alternatively, an example UI may facilitate a user selection to have only at least one user-selected class of items transcoded prior to execution of an item in the class of items.

In another aspect, a computer includes a storage including computer instructions, a network interface, and a processor configured to access the instructions to present at least one user interface (UI) facilitating at least one user selection of at least one reaction to encountering suspicious code in a transcoded version of an original item encountered on a wide area computer network prior to executing the transcoded version or the original item. The user selection can include one or more of (1) remove suspicious code found in the transcoded version and execute the transcoded version minus the suspicious code, (2) delete all versions of the item, transcoded and original, and (3) execute the transcoded version including suspicious code.

The details of the present disclosure, both as to its structure and operation, can be best understood in reference to the accompanying drawings, in which like reference numerals refer to like parts, and in which:

DETAILED DESCRIPTION

Figure 1:
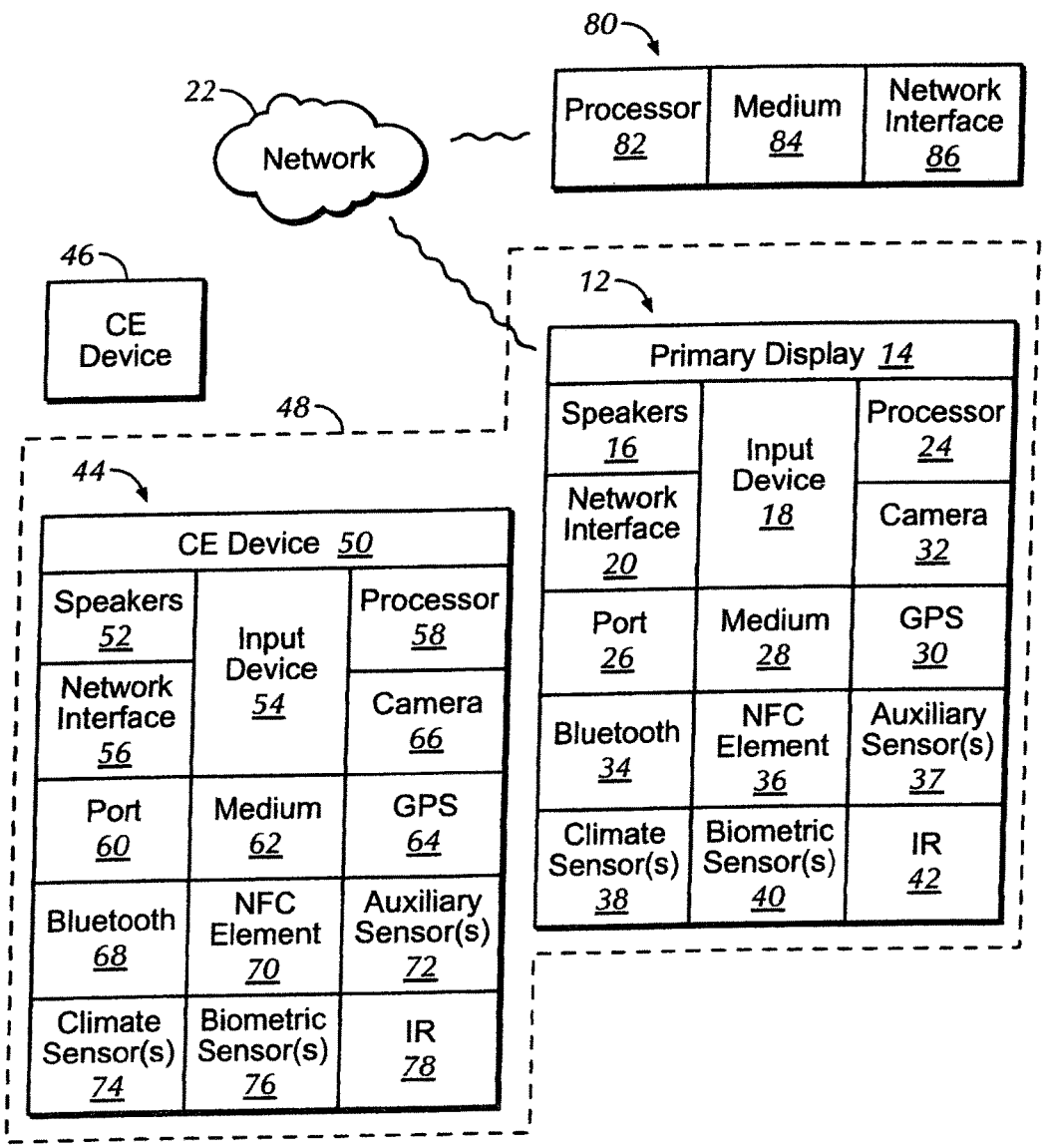
FIG. 1 is a block diagram of an example system including an example in accordance with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid state storage (including but not limited to flash memory). Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone.

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

As used herein, "transcoding" refers to the process of converting a file or object from one format to another. Transcoding may be used to convert one video format to another, but may also be used to convert HTML files and graphics files to a format that satisfies the constraints of mobile devices and other Web-enabled products. Transcoding can entail receiving a HTML or Javascript file and operate on it using a specified annotation to transcode the file to another format.

Figure 2:
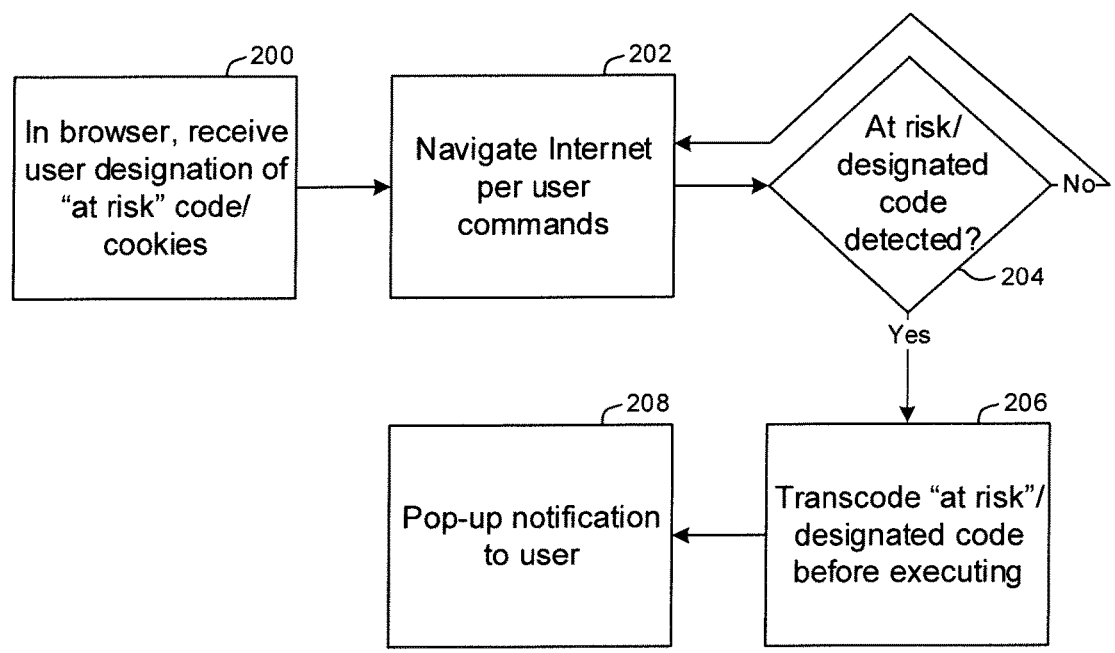
FIG. 2 is a flow chart of example logic.

With the above in mind and turning now to FIG. 2, at block 200 one or more user designations of "at risk" or otherwise user-designated code/objects is received. FIG. 2 thus represents executable instructions of an end user's browser (or a plug-in to the end user's browser) to implement present principles, giving the user control over what Internet downloads to filter per the following discussion. In this way, the end user controls his device's behaviors and security, instead of allowing such control to remain in the hands of the browser manufacturer or as dictated by hypertext markup language (HTML) or other code directly from an Internet link.

Proceeding to block 202, the browser navigates the Internet according to user navigation commands. As it encounters items such as web pages, pop-up ads, cookies, and so on to be downloaded and executed, the logic determines at decision diamond 204 whether any such items are among the user-designated code/items received at block 200. This determination may include ascertaining a geographic location of an item by noting its geographic extension in its network address (e.g., in its uniform resource indicator, or URI), e.g., ".de" for Germany or ".ca" for Canada. The determination may be include ascertaining a type of file as indicated in metadata accompanying the item, or as indicated by the URI of the item, or as indicated by an attempted communication from the item, or as indicated by a size of the item matching, e.g., the size of cookies, etc.

If any such item is found the logic moves to block 206 to transcode the item prior to allowing it to execute on the end user computer. All or part of the item may be transcoded. To execute the transcoding, the browser (or the browser plug-in) transcodes the HTML code to Java script code, or transcodes Java script code to extensible markup language (XML), etc., and in so doing changes the original code downloaded from an Internet link prior to execution of the original code. From a technical view, transcoding can be effected by programming in HTML JavaScript. The transcoding code in HTML JavaScript usually is executed in real time and the results can be cached or not cached. Transcoding may be to ASCII or other format.

As understood herein, the above-described transcoding can find, in the transcoded result, any malware code and remove that code or simply not execute the item containing the code as further explicated below. To locate malware code, the browser or browser plug-in can access a transcoding guide with a database or list or other identification indicia of known malware, with the list being automatically updated if desired by periodically having the browser or browser plug-in access an update site on the Internet. This prevents otherwise hidden malware code that has been downloaded from executing and embedding itself into the device.

Block 208 indicates that a notification may be presented to the user of any activity in states 204-206 as described further below in reference to FIG. 4.

Figure 3:
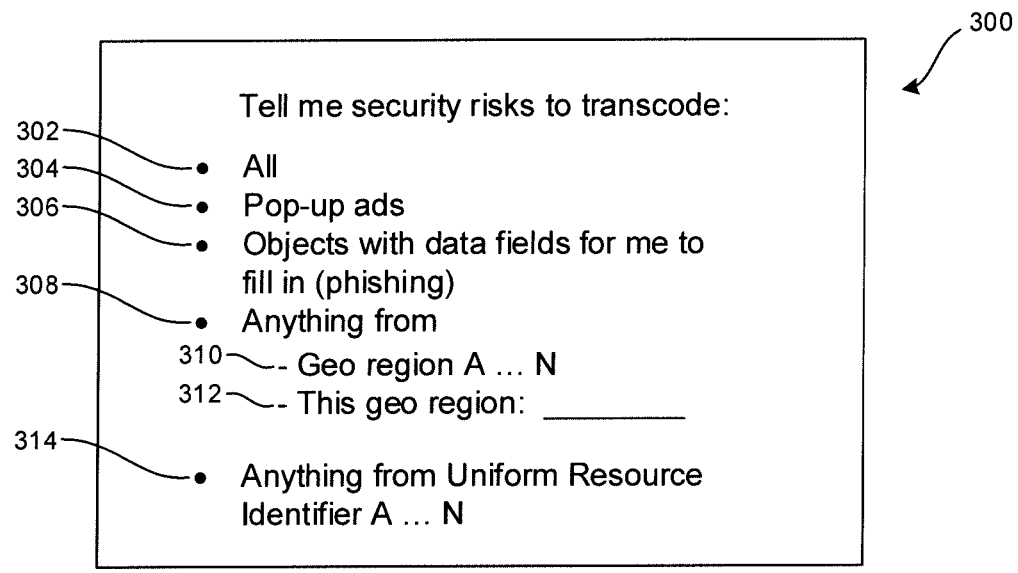
FIG. 3 is a screen shot of an example setup user interface (UI)
Figure 4:
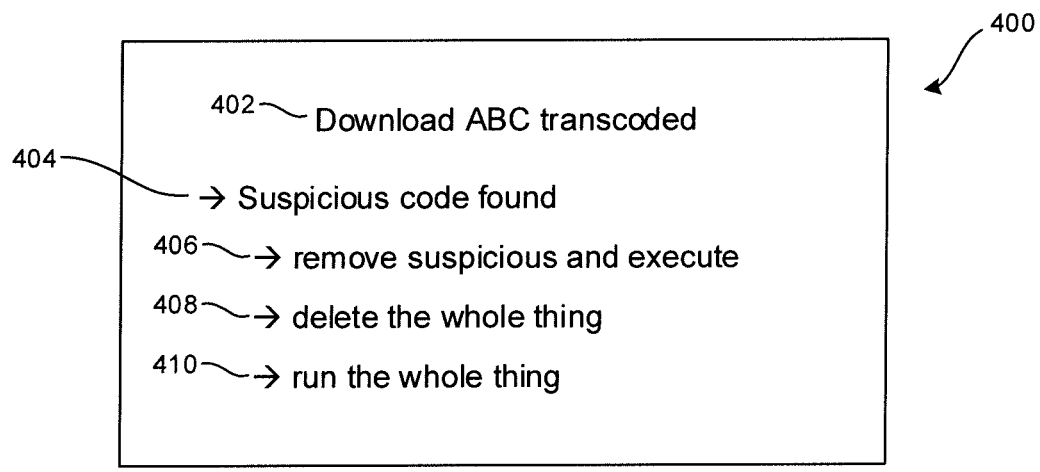
FIG. 4 is screen shot of an example UI that may be presented when suspicious code has been identified.

Turning to FIGS. 3 and 4, UIs are shown that can be presented to an end user of a browser on any of the displays described herein. The example UI 300 shown in FIG. 3 allows the end user to define what Internet downloads to transcode prior to allowing the downloads to execute. As indicated at 302, the UI may have a selector or other means for facilitating the user designating all code encountered on the Internet for download to be transcoded. The UI 300 may facilitate the user electing transcoding only for more targeted types of items such as pop-up ads, indicated at 304, possible phishing items as indicated by, e.g., items having data fields soliciting user completion, indicated at 306, any item downloaded by geographic region as indicated at 308, with particular geographic regions such as countries being selectable from a list by the user as indicated at 310 or manually designated by the user by entering the name or designation or other identification of the region into data field 312, and any item downloaded from user-designated network addresses such as individual URIs, as indicated at 314. Cookies also may be selected using the UI 300.

FIG. 4 shows a UI 400 that may be presented responsive to block 208 in FIG. 2. As shown a notification 402 may be presented that an item "ABC" has been downloaded and transcoded. If suspicious code has been found a notification 404 may be presented as such. In some cases one or more of the reactions shown at 406-410 may be executed automatically by the browser or browser plug-in without user interaction, but in other cases the user may be given the option to select one of the reactions listed as examples. That is, the user may select at 406 to have the suspicious code remove from the transcoded result and the remaining portion of the transcoded "ABC" executed. Or, the user may select at 408 to delete all of "ABC" in both original and transcoded form. Yet again, the user may select at 410 to run the transcoded version of "ABC" without removing the suspicious code.

Note that the selections in FIG. 4 may be made in near real time as malware is discovered or they may be pre-selected by the user by presenting all or part of FIG. 4 to the user during setup, along with the UI 300 of FIG. 3.

While the particular technical description is herein shown and described in detail, it is to be understood that the subject matter which is encompassed by the present invention is limited only by the claims.

What is claimed is:

1. A device comprising:
   at least one computer memory that is not a transitory signal and that comprises instructions executable by at least one processor to:
   receive at least one user selection of at least one network item for transcoding at such time as the network item is encountered on a wide area computer network by a browser;
   responsive to the browser navigating to a location on the wide area network at which the network item is encountered, transcode the network item prior to executing the item, the transcoding rendering a transcoded item; and
   determine whether to execute at least a portion of the transcoding item based at least in part on input from a user interface (UI) comprising at least a first selection to remove suspicious code found in the transcoded item and execute the transcoded item minus the suspicious code, a second selection to delete all versions of the item, transcoded and original, and a third selection to execute the transcoded item including suspicious code.

2. The device of claim 1, comprising the at least one processor.

3. The device of claim 2, wherein the at least one computer memory and the at least one processor are components of an end user computer.

4. The device of claim 1, wherein the instructions are native to the browser.

5. The device of claim 1, wherein the instructions are part of a plug-in associable with the browser.

6. The device of claim 1, wherein the determination whether to execute at least a portion of the transcoding item is not responsive to user input.

7. The device of claim 1, wherein the user interface (UI) is presented on an end user computer.

8. The device of claim 7, wherein the UI includes a first selection to delete all versions of the item, transcoded and original.

9. The device of claim 7, wherein the UI includes a first selection to execute the transcoded item including suspicious code.

10. The device of claim 1, herein the UI includes a second selection to execute the transcoded item including suspicious code.

11. A computer comprising:
    at least one storage including computer instructions;
    at least one network interface; and
    at least one processor configured to access the instructions to:
    present at least one user interface (UI) facilitating at least one user selection of at least one network item for transcoding at such time as the network item is encountered on a wide area computer network by a browser executed by the processor; and
    responsive to the browser navigating to a location on the wide area network at which the network item is encountered, transcoding the network item prior to executing the item, the transcoding rendering a transcoded item, wherein the UI facilitates a user selection to have only user-selected individual items transcoded prior to execution of the individual items and a user selection to have only at least one user-selected class of items transcoded prior to execution of an item in the class of items.

12. The computer of claim 11, wherein the UI facilitates a user selection to have all items encountered on the wide area network transcoded prior to execution.

13. A computer comprising:
    at least one storage including computer instructions;
    at least one network interface; and
    at least one processor configured to access the instructions to:
    present at least one user interface (UI) facilitating at least one user selection of at least one reaction to encountering suspicious code in a transcoded version of an original item encountered on a wide area computer network prior to executing the transcoded version or the original item, the at least one user selection including one or more of:
    remove suspicious code found in the transcoded version and execute the transcoded version minus the suspicious code, delete all versions of the item, transcoded and original, execute the transcoded version including suspicious code.

14. The computer of claim 13, wherein the at least one user selection includes two or more of:
    remove suspicious code found in the transcoded version and execute the transcoded version minus the suspicious code, delete all versions of the item, transcoded and original, execute the transcoded version including suspicious code.

* * * * *